United States Patent [19]

Blair

[11] Patent Number: 4,964,156

[45] Date of Patent: Oct. 16, 1990

[54] CELLULAR TELEPHONE UNIT CAPABLE OF AUTOMATIC INTERACTION WITH AUDIO SERVICES

[75] Inventor: Kevin B. Blair, Spring, Tex.

[73] Assignee: GTE Mobilnet Incorporated, Houston, Tex.

[21] Appl. No.: 443,836

[22] Filed: Dec. 1, 1989

Related U.S. Application Data

[63] Continuation of Ser. No. 223,863, Jul. 25, 1988, abandoned.

[51] Int. Cl.$^5$ .................. H04M 1/27; H04M 1/66; H04M 3/50; H04M 11/00
[52] U.S. Cl. .................................. 379/189; 379/40; 379/59; 379/63; 379/89; 379/355
[58] Field of Search ............ 379/89, 88, 67, 59, 379/63, 40, 41, 216, 357, 355, 91, 199, 198, 189

[56] References Cited

U.S. PATENT DOCUMENTS

| | | | |
|---|---|---|---|
| 4,160,124 | 7/1979 | Law | 379/357 |
| 4,720,855 | 1/1988 | Ohnishi et al. | 379/354 |
| 4,747,124 | 5/1988 | Ladd | 379/67 |
| 4,782,521 | 11/1988 | Burtlett et al. | 379/354 |
| 4,853,952 | 8/1989 | Jachruaun et al. | 379/88 |

Primary Examiner—Thomas W. Brown

[57] ABSTRACT

A cellular telephone unit includes logic circuitry programmed automatically to initiate a check of a tlephone-accessible audio-response system (e.g., a voice mailbox system) upon power-up of the telephone unit. The programming of the logic circuitry treats any number entered by the user during the check that does not correspond to the preprogrammed voice mail account number as a command, and thereupon discontinues the check and processes the command.

5 Claims, 5 Drawing Sheets

CELLULAR TELEPHONE UNIT CAPABLE OF AUTOMATIC INTERACTION WITH AUDIO SERVICES

This application is a continuation of application Ser. No. 223,863, filed July 25, 1988, now abandoned.

BACKGROUND OF THE INVENTION

This invention relates to telephones used in connection with, e.g., cellular telephone systems, and particularly to cellular telephones used in conjunction with telephone-accessible audio-response systems such as voice mailbox systems, stock quotation services, and so forth.

Systems of this type are quite familiar. A caller may access, e.g., a voice mailbox system by dialing an appropriate telephone number, e.g., on a DTMF-equipped telephone. When the voice mailbox system "answers the phone," it transmits a series of audio messages inviting the caller to enter a password. The caller may gain access to a voice mailbox by entering keystrokes that correspond to the correct password for that account, whereupon the voice mailbox system plays back any audio messages stored in its memory (e.g., voice messages left by previous callers).

SUMMARY OF THE INVENTION

In accordance with the present invention, a telephone unit is programmed to perform an automatic voice mailbox check. The telephone includes a user-programmable memory and is controlled by logic circuitry which is programmed to perform a sequence of operations upon a specified action by a user, e.g., upon power-up of the telephone unit.

If a theft alarm and/or other similar security features are activated, the logic circuitry waits to perform the remaining operations until deactivation of the feature. A preprogrammed telephone number for access to a voice mail system is retrieved from the memory. The preprogrammed telephone number may include zero or more pause commands and service access codes.

The logic circuitry then generates a signal to place a call to the voice mail system, including pausing where indicated by pause commands in the preprogrammed telephone number. Upon the establishment of a connection with the voice mail system, the logic circuitry waits for the user to press a sequence of one or more characters upon a keypad. When a sequence is pressed, the manual override capability is disabled and the sequence is evaluated.

During the initial signalling to establish a connection with the voice mail system, the logic circuitry enables a manual override capability. If a keystroke sequence entered manually by the user is not recognized by the logic circuitry as a voice mail identification number (or as a command to recall a voice mail identification number from a location in the memory), the logic circuitry assumes that the sequence represents an attempt to perform another function (e.g., dialing a different number). The logic circuitry then terminates any connection with the voice mail system and processes the keystroke sequence in the normal fashion.

BRIEF DESCRIPTION OF THE DRAWINGS

Throughout the following detailed description, similar reference numerals refer to similar elements in all Figures of the drawings.

DETAILED DESCRIPTION OF SPECIFIC EMBODIMENTS

An illustrative implementation of a microprocessor-based telephone system in accordance with the invention is presented here. The illustration uses an automobile cellular phone as an example, but it will be understood by those of ordinary skill that the invention can be implemented in virtually any telecommunications system.

Telephone Linked to MTSO

Figure 1:
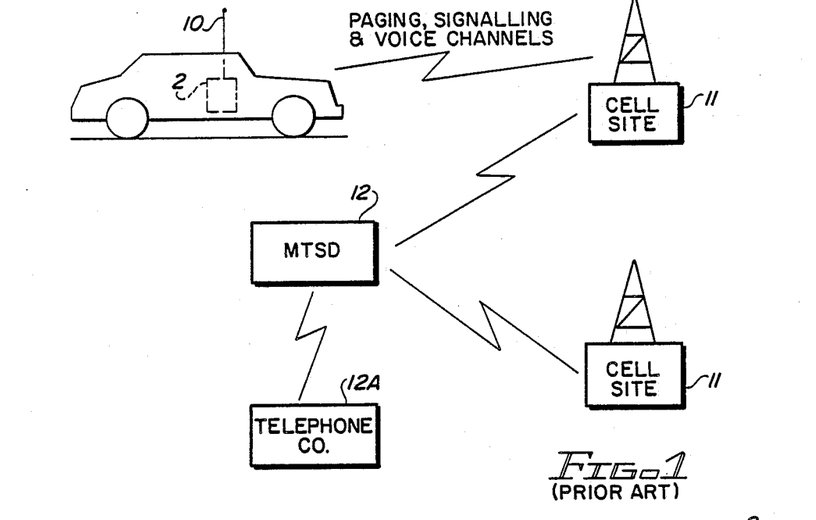
FIG. 1 is block diagram of a typical mobile cellular telephone and its link with a fixed switching unit.
Figure 2:
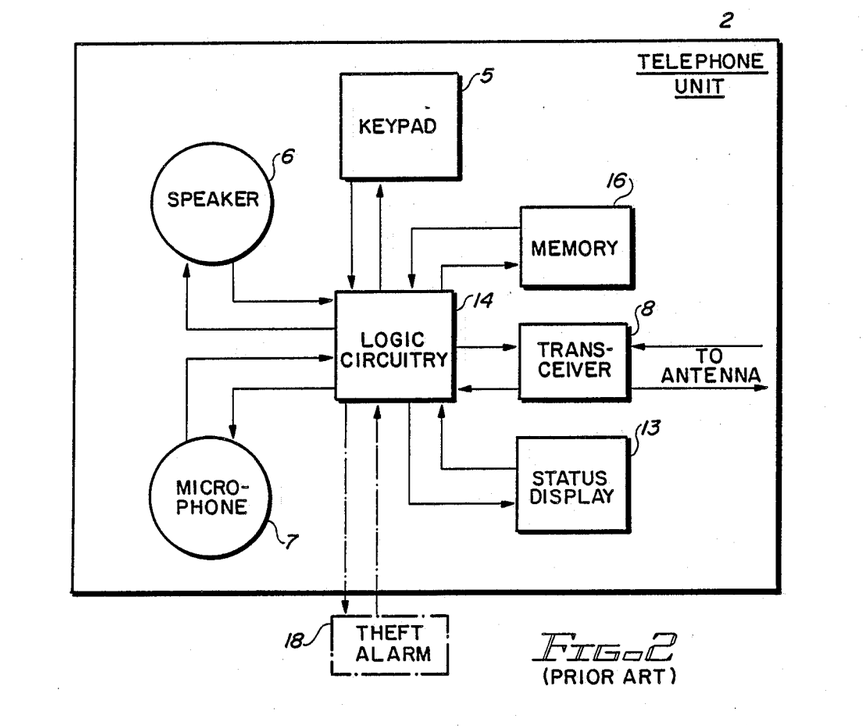
FIG. 2 is a block diagram of components of such a telephone.

FIGS. 1 and 2 show a typical automobile cellular telephone unit 2 having a unique mobile identification number (MID) stored in a suitable location such as an electrically eraseable programmable read-only memory (EEPROM, not shown). Telephone units of this kind are well known in the art and are described here only in sufficient detail to aid understanding the invention.

The telephone unit 2 includes a handset 4 having a keypad 5; equivalently, the keypad 5 could be located separately from the handset. Also included in the telephone unit 2 are a speaker 6 and a microphone 7, shown as being mounted within the handset 4 but either or both of which could equivalently be mounted apart from the handset, either separately (e.g., in a telephone operator's headset or in wall mountings), or approximately together (e.g., in a walkie-talkie or speakerphone configuration). It will be apparent to those of ordinary skill that if the keypad 5, the speaker 6, and the microphone 7 are all located apart from the handset 4, the handset can be dispensed with.

A transceiver 8, ordinarily built into the telephone unit 2, exchanges signals (via, e.g., an antenna 10) with a mobile telecommunications switching office (MTSO) 12, typically via radiotelephone signals relayed by one of several cell sites 11 that are in turn connected with the MTSO 12 via a landline. The MTSO 12 is ordinarily connected with a telephone company switching unit 12a via a high-capacity landline or similar connection.

Status Display and Logic Circuitry

A status display 13 shows the status of the telephone unit 2. The status display 13 typically includes a NO SVC indicator to show that no cellular telephone service is available; and a ROAM indicator to show that the telephone unit 2 is outside its usual service area.

The transceiver 8 and antenna 10 are shown as being separate from the handset 4, but either or both could equivalently be built into the handset. The MTSO 12 could equivalently be another telephone or similar unit if both telephones had appropriate signalling, switching, and call processing capabilities.

Those of ordinary skill having the benefit of this disclosure will appreciate that the signal exchange may utilize any of a wide variety of transmission systems that are equivalent for purposes of this description. These include, for example, radio, electrical-type wire (such as telephone landlines), modulation of light beams (e.g., in fiberoptic networks or laser beams), and so forth. The signal exchange may use one or more of these media alone or equivalently in combination. Whether specific components such as the antenna 10 are needed for a given implementation of the invention will depend in part on the transmission system selected for implementation.

The operation of the telephone unit 2 is controlled by logic circuitry 14. The logic circuitry 14 may be implemented in the form of, e.g., a microprocessor which executes program statements stored in a storage device such as a read-only memory, or equivalently by discrete logic components or one or more custom semiconductor chips.

Those of ordinary skill will appreciate that a sequence of numbers to be dialed by the telephone unit 2 is processed by the logic circuitry 14 generally as follows, both in the prior art and in connection with the invention. Under control of the logic circuitry 14, the transceiver 8 transmits a cellular control signal to a cell site 11 over a signalling channel. The control signal includes a request that the MTSO 12 dial a specified telephone number and assign a voice frequency or channel for use by the telephone unit 2.

The programming of the logic circuitry 14 includes the capability of recognizing a unique "pause" command in a dialing sequence and of pausing a signalling operation (such as dialing of a number) for a specified period of time when a pause command is encountered.

The telephone unit 2 includes a read-write memory 16, accessible to the user and whose contents will not be affected by telephone power-downs of ordinary duration. For example, the memory 16 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals.

A theft alarm 18 is shown in phantom as being connected by way of example to the transceiver 8. The theft alarm 18 may be of a variety of types well known to those of skill, e.g., an automatic-dialing type, one which sounds the car's horn (and thus need not be connected to the transceiver 8), etc. The theft alarm 18 forms no part of the invention and is shown in the drawings for purposes of clarity.

It will be understood by those of ordinary skill having the benefit of this disclosure that the specific details of any given implementation may vary considerably depending on the particular microprocessor or other components selected. The selection of components and the arrangement and programming thereof will be a matter of choice by the artisan for the particular application desired.

Voice Mailbox System

Figure 3:
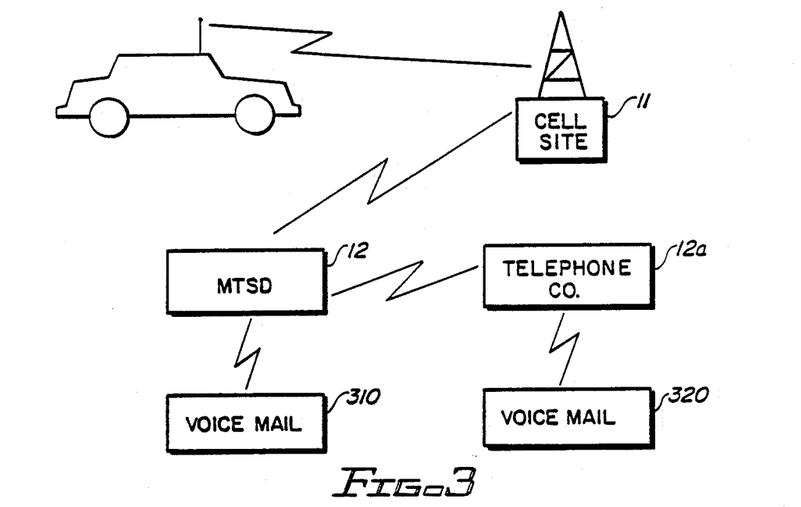
FIG. 3 is a block diagram depicting possible arrangements of an audio-responsive system (using a voice mailbox system as an illustration)

A voice mailbox system 310 is illustrated in FIG. 3. The voice mailbox system is a readily implementable variation on conventional systems of this type and is illustrated for purposes of clarity.

The voice mailbox system 310 may be maintained at or near the MTSO 12 (e.g., by the cellular telephone service company). It may be designed so that when an automatic voice mailbox check is performed as described herein, the MTSO 12 transmits a signal to the voice mailbox system 310 that identifies the specific telephone unit 2 performing the check (e.g., by MID). This is of course possible using conventional techniques, since the telephone unit 2 identifies itself to the MTSO 12 in the course of initiating any call.

Equivalently, a similar voice mailbox system 320 may be maintained at another location (e.g., by another company), to be accessed over telephone company lines.

Figure 3A:
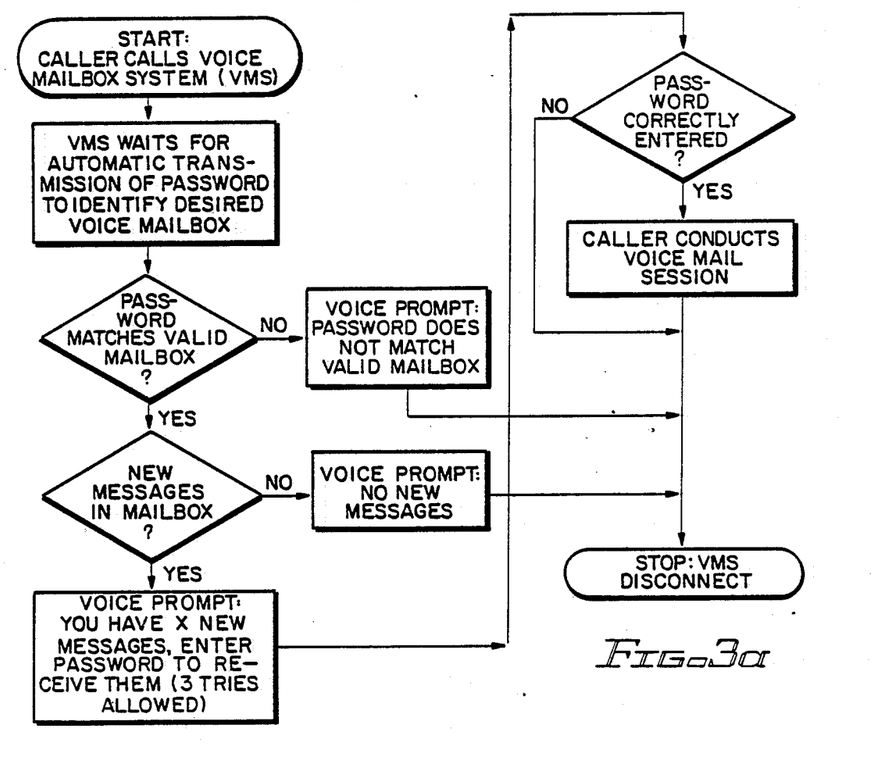
FIG. 3a is a flow chart of typical operations of such a system from a caller's perspective.

As shown in FIG. 3A, the voice mailbox system 310 is designed to respond to a specific sequence of DTMF or similar signals. These signals are explained in more detail below.

Memory Check and Self-Test

Figure 4:
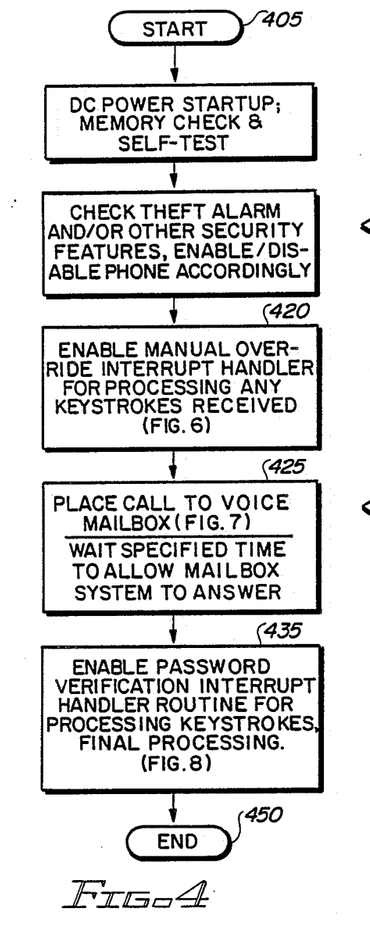
FIG. 4 is a flow diagram of logical operations programmed for execution by the telephone in accordance with the invention.

FIG. 4 is a high-level block diagram flow chart of the programming of the logic circuitry 14, for controlling operations performed by the telephone unit 2 in certain specified events.

Generally, the logic circuitry 14 initiates a conventional memory check and self-test upon DC power-up, as shown at process 410.

Theft Alarm and Other Checks

The next operation assumes that an automobile theft alarm 18, shown in phantom in FIGS. 1 and 2, is connected to or built into the telephone unit 2.

Figure 5:
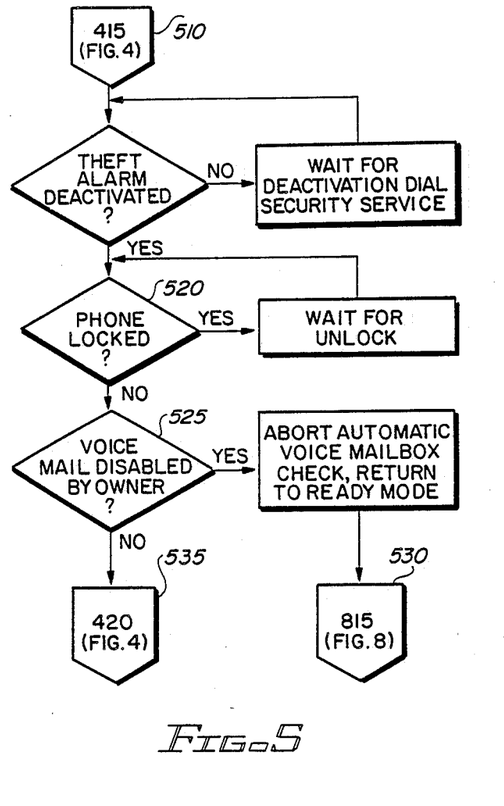
FIG. 5 is a flow diagram of specific logical operations of part of FIG. 4.

Referring to FIGS. 4 and 5, when the memory check is completed at process 410 (FIG. 4), the logic circuitry 14 goes into a loop 515 (FIG. 5) to wait for deactivation of the theft alarm, as indicated by process 517. The wait for deactivation may include automatic dialing of a preselected security number and the transmission of an alarm message after a certain time has elapsed, in accordance with techniques known to those of ordinary skill.

Likewise, if the telephone unit 2 is locked (mechanically, electronically, or through software), as shown at process 520, the logic circuitry 14 goes into a loop 520 to wait for the phone to be unlocked.

As shown at decision box 525, the logic circuitry 14 checks a status indicator (e.g., a flag in the memory 16) to determine whether the telephone unit 2 may be used for automatic access to the voice mailbox system 310. The status indicator may be set in any conventional manner. For example, the owner or usual user of the telephone unit 2 may enter a specific keystroke sequence (possibly including a secret password) upon the keypad 5 that is interpreted by the logic circuitry 14 as calling for disabling the automatic voice mailbox check. Another specific keystroke sequence (again possibly including a password) is interpreted as re-enabling the automatic check. If automatic access is disabled, the logic circuitry aborts the automatic voice mailbox check; the user, of course, may check the voice mail manually by dialing the appropriate numbers in the usual manner.

It will be understood by those of ordinary skill, of course, that the logic circuitry 14's programming for handling the theft alarm 18 and locking features are exemplary of programming for handling any number of similar authorization checks, equivalent for purposes of this description, wherein it is desired that the logic circuitry wait until certain conditions are established before initiating the voice mail check.

Manual Override Enablement

Figures 6, 7:
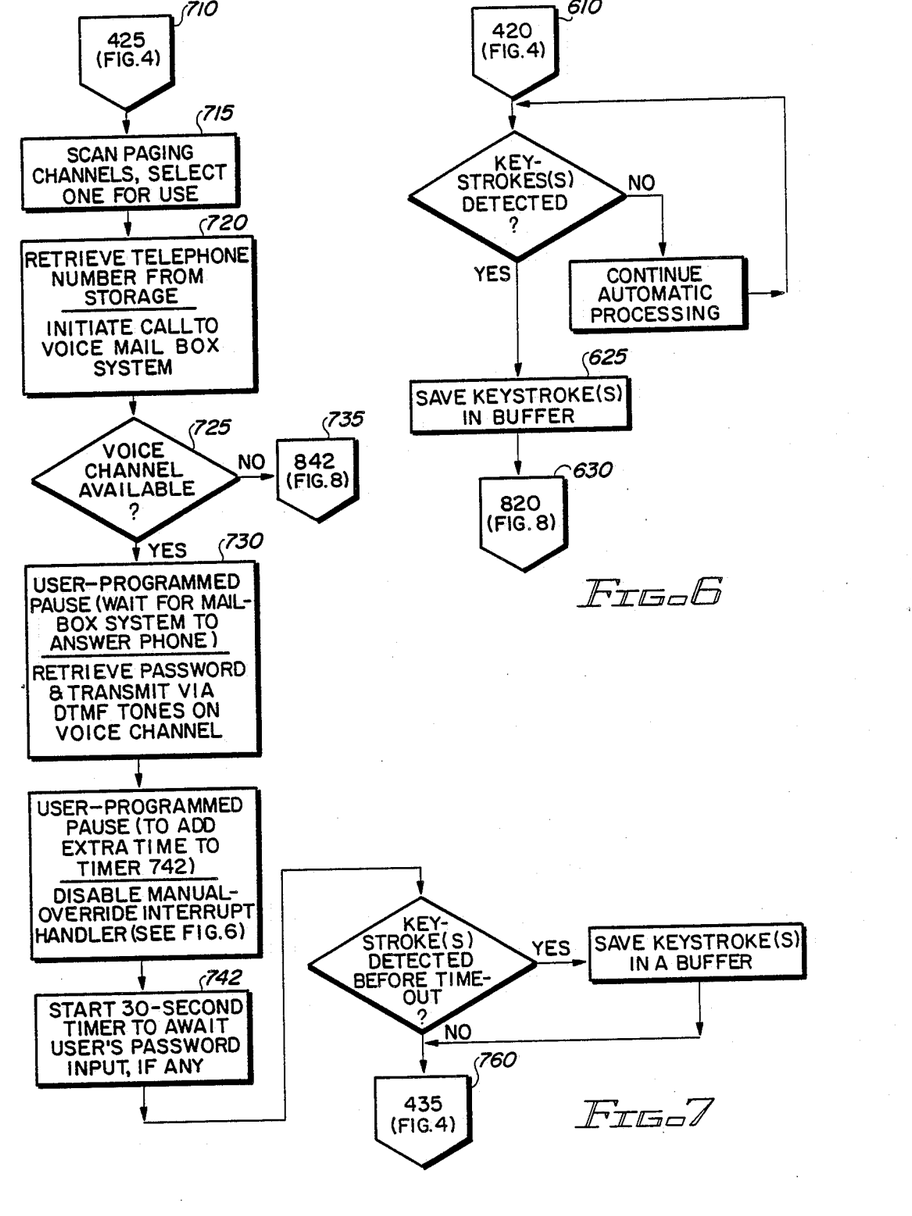
FIG. 6 is a flow diagram of other specific logical operations of part of FIG. 4.
FIG. 7 is a flow diagram of yet other specific logical operations of part of FIG. 4.

The logic circuitry 14 enables a manual override, as indicated by process 420 and at FIG. 6, if and when the theft alarm 18 is timely deactivated and other authorization checks are completed. The manual override is a conventional interrupt handling routine: if a keypress occurs on the keypad 5, the logic circuitry 14 interrupts its current activity and control branches to an appropriate service routine in accordance with known techniques. This enables user keystrokes to be given priority over automatic operations.

Selection of Paging and Signalling Channels

As shown at process 715 of FIG. 7, under control of the logic circuitry 14 the telephone unit 2 next proceeds in a conventional manner to monitor one or more prespecified sets of paging frequencies (referred to as paging channels), to determine the system identification (SID) code, if any, being broadcast by an MTSO 12 on the respective paging channels. Those of ordinary skill will recognize that an SID is a code that, within the service area in question, is uniquely associated with a particular company offering cellular telephone service. An MTSO 12, operated by a cellular service company, commonly broadcasts the associated SID from time to time on the paging channels that are assigned to that company for use within the service area.

The logic circuitry 14 may be programmed so that if a "home SID" (i.e., an SID of a cellular service company with which the user has an account established) is detected, the logic circuitry 14 places a call in a conventional manner (and as described below) by generating appropriate signals on the signalling channel associated with the selected paging channel. In such programming, if a home SID is not detected, the logic circuitry 14 discontinues the automatic voice mail check and proceeds to "ready" mode.

Equivalently, the logic circuitry 14 may be programmed to use paging and signalling channels associated with a nonhome SID if a home SID is not detected.

Initiation of Call to Voice Mail System

Once a paging and signalling channel pair has been selected for use, the logic circuitry 14 initiates a call to a voice mailbox system 310, as shown at process 720 of FIG. 7. The logic circuitry 14 retrieves the telephone number of the voice mailbox system 310 and transmits a conventional signal to the MTSO 12 requesting a connection to this telephone number. If no voice channel is available, the logic circuitry 14 displays "ready" status and terminates the attempt to check the voice mailbox system 310, as shown at decision point 725 of FIG. 7.

First Password Transmission

As shown at the process 730, upon acquisition of a voice channel, the logic circuitry 14 waits a specified pause time, preferably preprogrammable, then makes a DTMF transmission of a number corresponding to the password that identifies a particular voice mailbox to the voice mailbox system 310. In other words, the logic circuitry waits for a time that should be sufficient to allow the voice mailbox system 310 to "answer the phone," then sends the password of the voice mailbox associated with the telephone unit 2 (e.g., the mailbox of the usual user of the phone) to the voice mailbox system.

A number representing the pause time may be programmable (e.g., into a specified location in the memory 16) by a user or by a technician, in either case in a conventional manner, for retrieval by the logic circuitry 14 as part of the process 730. Equivalently, the pause time may be hardwired or hardcoded into the logic circuitry 14; in some implementations the relative lack of flexibility of such an approach might be offset by other considerations (e.g., savings of hardware). It will normally be preferred, however, that the pause time be programmable.

The logic circuitry 14 also retrieves the password from a suitable storage location, e.g., a specified location in the memory 16. The password is likewise preferably preprogrammable as just described above for the pause time. In some implementations, the voice mailbox system 310 may be designed so that the password of the voice mailbox associated with any given telephone unit 2 is the same number as the mobile identification code (MID) that uniquely identifies the telephone unit 2, in which case retrieval of the password can be accomplished by retrieving the MID from its own storage location. Equivalently but somewhat less flexibly, the password may be hardwired or hardcoded into the logic circuitry 14.

The password is shown as being retrieved at process 730, but it will be apparent to those of ordinary skill having the benefit of this disclosure that this retrieval may take place at any time prior to the transmission of the password to the voice mailbox system 310.

To promote the security of the password, the programming of the logic circuitry 14 is preferably designed (in accordance with conventional techniques) so that the contents of the memory location in which the password is stored are not ordinarily accessible to a user and are retrievable only by the logic circuitry 14 in connection with an automatic voice mailbox check as described here.

Particular Embodiment for First Password Transmission

The telephone unit 2 may be equipped to handle indirect memory addressing as described in my U.S. Pat. No. 4,875,230 entitled "Cellular Telephone Unit Having Multiple Memory Location Command Language," Ser. No. 223,864, filed June 25, 1988, assigned to the assignee of this application. Such an implementation permits a particular approach to be used for storage and retrieval of the voice mailbox telephone number and password.

In such an implementation the logic circuitry 14 is programmed to process "recall" commands in a special manner. Briefly, any user memory location (e.g., "speed dialing" memory locations) may be loaded with an arbitrary sequence of recall commands that make reference to specific user memory locations, pause commands, and other keystrokes such as numbers.

The logic circuitry 14 processes the contents of any such memory location (referred to as a dialing sequence) as follows. Any recall command in the dialing sequence is processed by substituting the contents of the referenced user memory location for the recall command in a conventional manner; in other words, each recall command is expanded as a macro. If a referenced user memory location itself contains recall commands, those commands are themselves expanded using conventional recursive or iterative techniques. The fully-expanded dialing sequence will thus have no recall commands, but instead will include the contents of all referenced user memory locations.

Any keystrokes in a dialing sequence that occur prior to a first pause command in the dialing sequence are treated as intended for processing on the signalling channel during the initial signal exchange between the telephone unit 2 and the MTSO 12. Keystrokes subsequent to the first pause command (including subsequent pause commands) are treated as intended for processing after acquisition of a voice channel. For example, the dialing sequence "800-555-1212-P-12345-P-67890" (hyphens are inserted for clarity) would result in transmission of "800-555-1212" over the signalling channel, followed by "12345", a pause, and "67890" as DTMF tones over the voice channel.

In such an implementation, the components of the dialing sequence (i.e., the telephone number of the voice mailbox system 310 and the password for the voice mailbox in question) may be stored separately in a plurality of user memory locations (the password possibly being stored in a restricted location as described above). The dialing sequence itself can then be represented in another user memory location as a combination of recall commands and pause commands.

In particular, the dialing sequence may include (1) a recall command referencing a user memory location containing the telephone number or other access number of the voice mailbox system 310; (2) a first pause command; (3) a recall conmmand referencing a user memory location containing the password; and (4) a second pause command. Equivalently, the entire dialing sequence may be stored in a single user memory location.

It will be apparent that the logic circuitry 14's processing of the dialing sequence thus results in (1) transmission of the voice mailbox system access number on the signalling channel; (2) pausing a sufficient length of time to allow the voice mailbox system 310 to "answer the phone"; (3) transmitting the password, e.g., in DTMF tones (which will be received and presumably recognized by the voice mailbox system 310); and (4) pausing to the extent of any optional second pause command.

Verification for Second Password Transmission

Figure 8:
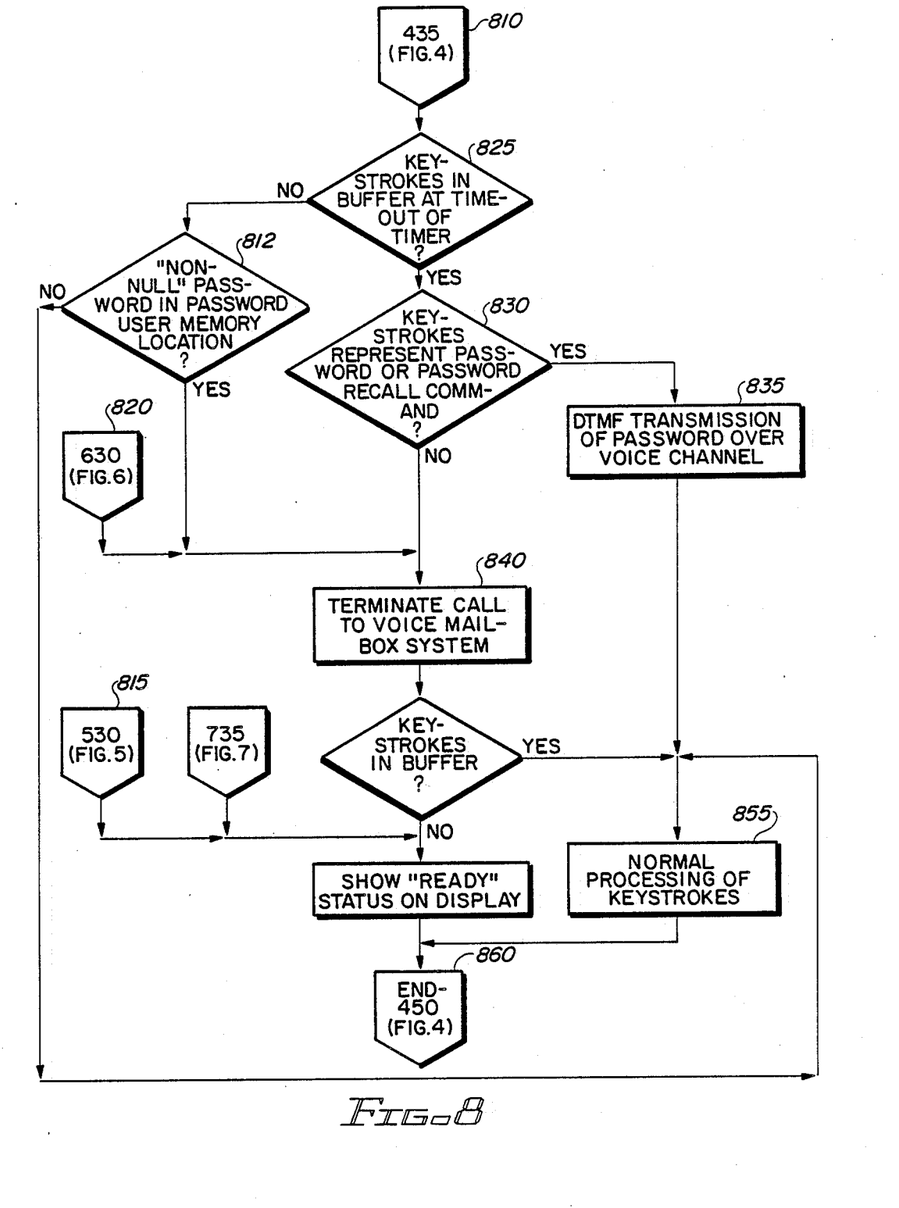
FIG. 8 is a flow diagram of another specific set of logical operations of part of FIG. 4.

It has been noted that the voice mailbox system 310 is assumed to be designed (per FIG. 3A) to require two transmissions of the password in order to gain access to a mailbox, a first time (presumably automatically) to identify the desired mailbox and a second time (manually) to authenticate the caller's access authority. As shown in FIG. 8, the logic circuitry 14 is programmed to provide additional password security in two ways.

The first way relates to the situation in which the user of the telephone user 2 does not enter any keystroke sequence at all, and a fortiori has failed to enter a password (e.g., in response to the usual audio prompting by the voice mailbox system 310). If (a) the user does not enter a password within a specified time (decision box 825), and (b) a "nonnull" password is found in the password storage (decision box 812), then (c) the logic circuitry 14 terminates the call to the voice mailbox system 310 (process 840). If a "null" password is found in the password storage, on the other hand (decision box 812), the logic circuitry 14 assumes that no password is required and continues with the automatic voice mailbox check as described below. A "null" password may be a blank memory, a pause command, or other similar identifier.

The second way of providing additional password protection relates to the situation in which a password is found in the password storage (decision box 812), and the user enters a keystroke sequence (decision box 825), but the keystroke sequence does not match the password. The logic circuitry 14 reads any manual keystrokes that may be entered during the automatic voice mail check and compares them with any password that is stored in the password storage (decision box 830). If (a) the keystrokes do not correspond to the password itself, and (b) they do not correspond to a command to recall a value (that itself proves to be equal to the password) from user-programmable storage such as a location in the memory 16, then (c) the call to the voice mailbox system 310 is terminated (process 840) and the keystrokes are treated as a manual-override keystroke sequence and processed as an ordinary user command, e.g., to dial a number (process 855).

If the correct password or password-recall command is timely entered by the user, the logic circuitry 14 causes a DTMF transmission of the password over the voice channel, presumably to the waiting voice mailbox system 310 (process 835). Keystrokes thereafter entered by the user are processed in the normal manner; this is shown by process 855, but in some implementations it may be preferable simply to terminate the voice mailbox check routine at this point and return to normal operation for keystroke processing.

Other Features

Other features may be added for the convenience of the user or for security. For example, the logic circuitry 14 may be programmed to enable an "in-use" display (such as the status light commonly provided on mobile telephones) at a time, e.g., beginning when the telephone call to the voice mailbox system 310 is initiated. As a security measure, the logic circuitry 14 could be programmed to keep the speaker 6 silent until after the first, automatic transmission of the password.

It will be appreciated by those skilled in the art having the benefit of this disclosure that this invention is believed to be capable of application in other situations in which the hardware and software work in substantially the same way to achieve essentially the same result. Some of these situations have been expressly described here (as examples and not as limitations), and others will be recognized by those of skill. Accordingly, this description is to be construed as illustrative only and as for the purpose of teaching those skilled in the art the manner of carrying out the invention.

It is also to be understood that various modifications and changes may be made, e.g., in the shape, size, and arrangement of components, operating steps, and so forth, without departing from the spirit and scope of the invention as set forth below in the claims. It is intended that the following claims be interpreted to embrace all such modifications and changes.

What is claimed is:

1. A method of operating a telephone unit having a keypad, a memory programmable by a user to store predetermined information including numbers, commands and pause commands, and control logic means for performing a series of steps including:
   retrieving from said memory in response to an initiating action a stored telephone number for a telephone accessible response system;
   automatically sending a signal using said telephone number to originate a call to said response system;
   providing a predetermined interval after the call is established for a user to enter a sequence of zero or more characters upon said keypad to create a keypad signal;
   monitoring the keypad signal to detect, if entered, a predetermined password sequence;
   in responsive to detection of said password sequence, transmitting the password to said telephone accessible response system, and
   in responsive to non-entry of said password sequence, interrupting any connection of said telephone unit with said telephone accessible response system, and treating any entered sequence as a possible user command, including an instruction to originate a call to another telephone number represented by an entered sequence.

2. The method of claim 1 further including:
   monitoring said predetermined password sequence to identify either a manually entered password, or a recall command sequence to recall a password from a preselected location in said memory.

3. The method of claim 2 further including:
   retrieving the password from memory in connection with an automatic operation with a response system, without making the password from memory available to a user.

4. A method of operating a telephone unit having a keyboard, a memory programmable by a user to store predetermined information including numbers, commands and pause commands, and control logic means for performing a series of steps including:
   in response to application of power to the telephone unit determining if a security feature is activated, including creating a pause interval to permit deactivation of said security feature;
   retrieving from said memory a stored telephone number for a telephone accessible response system, wherein said telephone number includes a password and zero or more pause commands;
   generating a signal to place a call to the response system, said signal including pauses where indicated by pause commands in the telephone number for said system;
   creating a predetermined interval in said series of operations appropriate for a user to enter a sequence of zero or more characters upon said keypad to create a keypad signal which may represent password information;
   monitoring said keypad signals to detect, if entered, a predetermined password sequence; and
   in response to detection of said password sequence, transmitting the password from memory to said telephone accessible response system.

5. The method of claim 4, further including:
   in response to non-entry of a password sequence, interrupting any connection of said telephone unit to said response system, and
   treating any entered sequence as a possible user command to dial a telephone number represented by the sequence.

* * * * *